3,488,293
PREVENTION OF CORROSION DUE TO UREA FERTILIZER EFFLUENT
Do J. Hong, Chung-ju, Korea, and Edward R. Johnson, Hopewell, Va., assignors to Allied Chemical Corporation, New York, N.Y., a corporation of New York
Filed Oct. 16, 1964, Ser. No. 404,268
Int. Cl. C01b 2/04; C09k 3/00
U.S. Cl. 252—372                                   1 Claim

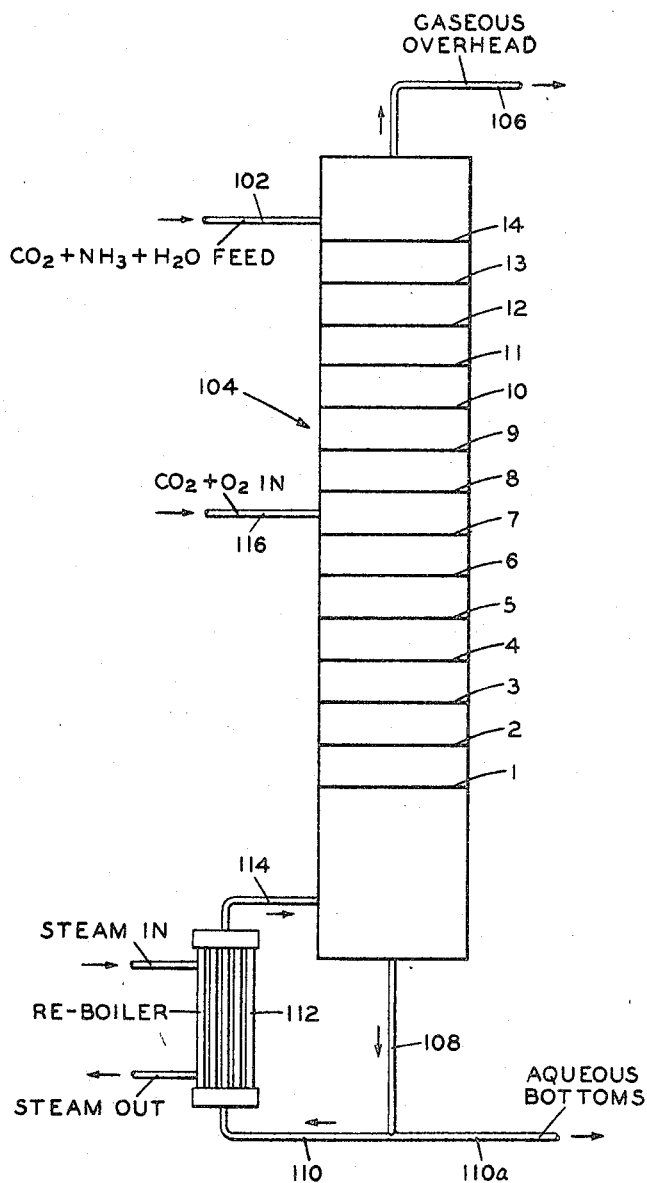
INVENTORS:
EDWARD R. JOHNSON
DO J. HONG

ABSTRACT OF THE DISCLOSURE

Add 0.1–20% oxygen in a system of carbon dioxide to a stainless steel stripper for separating ammonia and carbon dioxide from urea production gaseous effluent based upon the weight of the stream. Point of introduction of the production gaseous effluent is at the top of the stripper and point of injection of oxygen is below the lowest point of the stripper which is subject to corrosion by the effluent in order to avoid explosive hazards in the stripper due to accumulation of hydrogen gas from the effluent.

---

This invention relates to fertilizer process effluents and in particular, effluents from the production of urea useful as fertilizer, which effluents are corrosive to stainless steel and the like normally employed in apparatuses used in urea plants. More particularly, this invention relates to the prevention of corroscion in gas strippers employed to separate the gaseous effluents from urea synthesis.

Urea is normally produced in commercial practice by the reaction of ammonia with carbon dioxide. The ammonia reactant is prepared commonly by the Haber process of reacting nitrogen with hydrogen. Although little hydrogen is normally present in the gases fed to the urea production operations, severe explosions have sometimes occurred in such operations and it must be assumed that hydrogen may be present in explosive amounts in gases fed to the urea production. When the urea is prepared, this hydrogen does not react and is carried through the process and is present in the gaseous effluent from the urea reaction vessel. In the urea production, itself, there has been observed substantial corrosion of the reaction apparatus normally constructed of stainless steel, which corrosion is thought to be caused by the action of the ammonia and $CO_2$ gases. To inhibit the corrosion in the urea production, it has been suggested to introduce oxygen together with the carbon dioxide, thereby causing the oxygen to form a coating on the stainless steel apparatus and prevent corrosion thusly. This same corrosion problem is observed also in the production of melamine by heating an aquo-ammono carbonic acid such as urea. The effluent from the melamine production is quenched with water to obtain a hot aqueous slurry of melamine containing impurities and residual unreacted urea. This hot solution at temperatures of say 90° C. and 150° C. is subsequently separated from the ammonia and carbon dioxide evolved under lowered pressure and is further treated to purify the substance. Again the ammonia and carbon dioxide are available to cause impurities in the product and corrosion of the stainless steel apparatus. One method of reducing the corrosion is to eliminate from the apparatus the corrosive ingredients, especially $CO_2$, but as in the case of urea, these gases for economical use will be used as recycled to produce urea from which melamine or a fertilizer can be made. To reccycle the gaseous effluent, it is necessary to pass them through a gas stripper. The stripper is subject, therefore, to even greater corrosion than the apparatuses used for the melamine production or the urea production since the $CO_2$ available to react with $NH_3$ is largely consumed in production of urea and is quickly removed from the reaction chamber in melamine processes, while, on the other hand, $CO_2$ and ammonia are continuously vaporized in the stripper forming an extremely corrosive mixture, particularly at the gas-liquid interface.

Addition of oxygen to the gaseous effluent feed to reduce corrosion in the gas stripper is undesirable since the gaseous effluent may contain free hydrogen concentrated in local parts of the gas stream and hence, the addition of oxygen could be an explosive hazard which would necessitate shutdown of the entire process with resultant loss. It has been found that as the gaseous feed effluent containing $NH_3$, $CO_2$ and water to be separated is fed into the gas stripper at or near substantially the top of the stripper column, this portion of the column is subject to the most severe and concentrated corrosive action of the gaseous effluents and even high grades of stainless steel do not resist the concentrated corrosive action of these gases.

It is an object of this invention to provide substantial corrosion inhibition of the stainless steel apparatus used in gas stripping of urea process gas effluents.

It is another object of this invention to provide such corrosion inhibition without the introduction of substantial amounts of foreign substances which would require further purification of the gas stripper tops and bottoms.

These and other objects of this invention will become more apparent from the following more complete description and claim.

In accordance with our invention, gas strippers for separating ammonia, carbon dioxide and water are made corrosion resistant during the stripping process by injecting into the stripper a stream of carbon dioxide and oxygen, the oxygen being present in an amount between 0.1% and 20% by weight, the point of injection being so located that the $CO_2$ and oxygen gas mixture passes upward through said stripper and the $CO_2$ and oxygen is introduced below the lowest point of the stripper subject to corrosion. We have found that by injecting a gas mixture of oxygen and carbon dioxide, oxygen being present in an amount between 0.1% and 20% by weight, the injection point being so selected that the gases pass upward through the stripper, that the top of the stripper containing the uppermost sieve trays is protected from the water, ammonia and carbon dioxide gases being fed through the top of the gas stripper by formation of a coating on the surface of the stainless steel apparatus, thus preventing pitting of the normally resistant metal apparatus and corrosion can be essentially entirely prevented. In contrast thereto without using the carbon dioxide and oxygen gas stream, the pitting causes a minimum average corrosion rate in stainless steel of 48 mils per year. The pitting attack heretofore experienced was especially disadvantageous as penetration of the stainless steel liner of the apparatus occurred much more rapidly than would be anticipated from the weight loss corrosion rate. In addition to the above, the instant process for avoiding corrosion of stainless steel strippers prevents pitting corrosion heretofore experienced, which caused production of corrosion products plugging the sieve trays located in the stripper and requiring plant shutdown for cleaning.

Our process for reducing the corrosion in ammonia strippers is carried out in an ammonia stripper as depicted in the accompanying dawing. The $CO_2$, $NH_3$ and water from the urea reactor, are fed into the ammonia stripper 104, through line 102. The ammonia stripper is operated at temperatures between 120 and 175° C. and at pressures, say between 5 and 10 atmospheres gauge. The $CO_2$ and ammonia which is separated from the water present in the feed, passes out line 106 while the water passes down through the ammonia stripper 104 and out line 108. The water passing through line 108 contains essentially no dissolved carbon dioxide or ammonia and is passed through line 110 to reboiler 112, thence out of reboiler 112 through line 14 and into the bottom of the ammonia stripper 104 to form stripping steam to strip out dissolved ammonia or $CO_2$ gases which pass upward through the ammonia stripper 104 and out the gaseous overhead line 106. The water then passes down through line 108 and out through line 110A. At the most corrosive section of stripper 104, the carbon dioxide is normally present in about 10 to 35 weight percent; the ammonia is present in amounts between about 20 and 60 weight percent and the water is present normally in amounts between about 5 and 70 weight percent, the total composition of the three ingredients being about 100%, exclusive of the amount of oxygen introduced through line 116 together with diluent carbon dioxide gas. The composition of the gaseous overhead contains about, say, 30 to 35% carbon dioxide, 55–65% ammonia, and small amounts of water, say, 5–10%. The composition of the aqueous bottom passing out line 110A, is substantially entirely water, with perhaps small but hardly detectable amounts of carbon dioxide and ammonia. The composition of the feed, i.e., the urea production effluent on the other hand, contains, say, 60 to 70% $H_2O$, 20 to 25% ammonia and 10 to 15% $CO_2$, totaling 100%. It can be conveniently introduced at a temperature of 120° C., the gaseous overhead coming off at, say, 130° C. and the aqueous bottom coming off at, say, 175° C., the pressure at the bottom of the ammonia stripper in the space below the first tray being, say, 115 p.s.i.g. The carbon dioxide and oxygen introduced to eliminate corrosion at the top of the stripper which gaseous composition is introduced through line 116 can be conveniently introduced in the vapor spaced above the seventh tray at a temperature ranging between 160 and 170° C., under the above operating conditions.

We have found that by injecting a carbon dioxide-oxygen mixture having the above amounts of oxygen present, that the stainless steel stripper apparatus can be made corrosion proof by preventing explosions due to the presence of hydrogen in the urea-effluent gases and oxygen being passed through the stripper. We therefore, can safely operate a plant using this process without the fear of plant shutdown due to explosion. It is theorized that explosion does not occur when operating according to our process since the oxygen is introduced into the ammonia stripper at a point remote from the point of injection of the ammonia, carbon dioxide and water feed effluent and is diluted by use of a process gas, to wit, carbon dioxide. Furthermore, the oxygen becomes even more diluted throughout the stripper as it passes through and around the stripper sieve trays between the point of injection and the top of the gas stripper. Hence, when the oxygen reaches the point of introduction of the ammonia and carbon dioxide gas effluent, it is present in such a diluted amount that the "explosive limit" of the oxygen and hydrogen at any point is not reached. However, although the oxygen is very diluted at the top of the stripper where the most severe corrosion occurs, surprisingly, it is present in sufficient amounts to form the desired protective coating on the stainless steel apparatus and thus permit continuous and uninterrupted use of the gas stripper.

It is critical in our invention that the oxygen concentration in the carbon dioxide and oxygen gas mixture being so injected into the stripper not exceed 20% by weight as concentrations of oxygen in excess of this could not probably under normal conditions become sufficiently diluted upon passage of the gas upwards through the stripper. Hence, the possibility of explosion when the oxygen comes in contact with hydrogen in localized high concentration would increase and operation thusly would be hazardous. Although this may seem to be at first glance disadvantageous, it should be noted that amounts of oxygen above the maximum critical limit are not needed for effective corrosion prevention of the stainless steel stripper. On the other hand, the oxygen content in the oxygen and carbon dioxide gas mixture so injected must be at least 0.1% by weight. Amounts of oxygen less than 0.1% in the gas mixture are not sufficient to readily form a coating about the portions of the stripper sensitive to the corrosive action of the gas effluent containing the ammonia, carbon dioxide and water. We prefer, in our process, that the oxygen content be in the range of 300 to 500 p.p.m. oxygen by volume in the stripper overhead gas (calculated on a dry basis). This can normally be provided in commercial operations using say, a 14 sieve tray ammonia stripper column, by injecting a carbon dioxide gas stream containing 1% oxygen by volume, the injection being made say, in the vapor space above the 7th tray from the top of the stripping column.

A particular advantage provided by our process is that by using carbon dioxide as an oxygen diluent and perhaps also an oxygen carrier to provide a gas mixture which causes formation of a coating on the stainless steel apparatus, we do not add to the stripper any significant or appreciable amount of any substance foreign to the normal contents of the stripper itself. The carbon dioxide so injected can be readily separated with the ammonia as overhead at the top of the stripper while the water readily falls to the bottom of the stripper under normal process conditions. Since carbon dioxide is already present in the feed, additional carbon dioxide being added to the stripper does not prevent economical and efficient use of the gas stripper.

In order to illustrate the nature of our invention and the manner of practicing the same, the following example is set forth.

EXAMPLE I

Into an ammonia stripper containing 14 sieve trays was fed continuously gas effluent from urea production containing about 12% $CO_2$ by weight, 22% $NH_3$ by weight and about 66% $H_2O$ at 120° C. above the top or 14th sieve tray. The pressure in the stripper was 115 p.s.i.g. and the temperature of the effluent from the stripper was 130° C. At the bottom of the stripper there was provided means for withdrawing the water bottoms and reheating it to insure that the carbon dioxide and ammonia in admixture with the water passed out of the stripper from the top thereof and that the bottoms consisted almost entirely of water. Using a stripping column of SS304 clad carbon steel, iron concentration in the bottoms was high and inspection showed heavy corrosion in the upper trays. The top eight feet of the unit was then lined with SS319L. This material was corroded and was penetrated following which the unit was relined using SS316L. This third stainless steel liner also was penetrated in time, the best of the stainless steels showing a minimum average corrosion rate of 48 mils per year.

A lance was installed to inject carbon dioxide containing oxygen in the vapor space above the 7th tray from the top of the stripping column. Sufficient gas was injected to give a concentration of 300 to 500 parts per million oxygen by volume, dry basis, in the stripper overhead gas using a carbon dioxide gas stream containing about 1% by volume oxygen.

Inspection after six weeks operation with oxygen injection revealed that a protective film had covered the area where corrosion was heavy from previous operations. Operation with continued addition of the mixture of oxygen and carbon dioxide diluent gas was continued and subsequent inspections revealed that pitting attack previously observed and the pluggage of the sieve tray holes with corrosion products had been eliminated.

The following table gives corrosion rates determined over a 2-year period including 9 months operation with oxygen addition. During the oxygen addition with the carbon dioxide diluent, no explosion was experienced at the top of the stripper column.

| Material | Environment | Corrosion rate, inches per year | |
|---|---|---|---|
| | | Without Oxygen Addition | With Oxygen Addition |
| SS 304 | Stripper top tray | .160 | .008 |
| SS 316L | do | .056 | .007 |
| SS 319L | do | .048 | (¹) |

¹ Weight gain.

THE ANALYSES OF THE STAINLESS STEELS USED IN THE STRIPPER

| | SS 304 | SS 316L | SS 319L |
|---|---|---|---|
| Chromium | 18.0–20.0 | 16.0–18.0 | 17.5–19.5 |
| Nickel | 8.0–10.0 | 10.0–14.0 | 11.0–15.0 |
| Molybdenum | 0.60 | 2.00–3.00 | 2.25–3.00 |
| Carbon | 0.08 | 0.025 | (¹) |
| Manganese | 2.0 | 1.72 | (¹) |
| Potassium | 0.04 | 0.024 | (¹) |
| Sulfur | 0.03 | 0.012 | (¹) |
| Silicon | 1.00 | 0.55 | (¹) |
| Iron | Balance | Balance | Balance |

¹ Not available.

From the foregoing, it is readily apparent that we have provided a significant contribution in the art of fertilizer production on a plant size basis and more particularly, have provided a method of inhibiting corrosion at the top of the ammonia strippers used to separate water from gas and carbon dioxide effluents say from urea production. It is also apparent that we have provided a method which does not necessitate introduction of substantial quantities of substances foreign to the stripper environment itself and we have provided a corrosion inhibiting process which can be operated without explosion.

The foregoing disclosure has been set forth merely to illustrate the nature of our invention and the manner of practicing the same and is not to be construed as limiting the scope of our invention since certain modifications or departures therefrom will become apparent to one skilled in the art.

We claim:

1. A process for preventing internal corrosion of and hydrogen gas explosion within stainless steel gas strippers used to separate ammonia and carbon dioxide from urea fertilizer production gaseous effluents containing ammonia, carbon dioxide, water and small amounts of hydrogen, which comprises:

(a) feeding the gaseous effluents into the top portion of the stripper;
   (b) injecting into a remote, lower portion of the stripper, at a point below the lowest point of the stripper subject to corrosion, a stream of carbon dioxide and oxygen, the oxygen being present in an amount between 0.1% and 20% by weight based on the total weight of the carbon dioxide and oxygen in the stream, sufficient oxygen being injected to maintain between 300 and 500 p.p.m. oxygen by volume dry basis in the stripper overhead gas, the point of injection being thereby so located that the carbon dioxide and oxygen gas mixture passes upward through the stripper;
   (c) maintaining the stripper at temperatures between 120° and 175° C. and at pressures between 5 and 10 atmospheres gauge, the composition of the ingredients of the stripper, exclusive of the oxygen introduced, being 10 to 35% by weight carbon dioxide, 20 to 60% by weight ammonia and 70 to 5% by weight water, with relatively small amounts of hydrogen, whereby the ammonia and carbon dioxide are separated overhead; and
   (d) recovering essentially all of the ammonia and carbon dioxide, together with a small proportion of water, as overhead from the stripper.

References Cited

UNITED STATES PATENTS

| | | | |
|---|---|---|---|
| 2,727,069 | 12/1955 | Van Waes | 260—555 |
| 2,848,493 | 8/1958 | Dewling et al. | 260—555 |
| 3,137,724 | 6/1964 | Guyer et al. | 260—555 |
| 3,162,550 | 12/1964 | Dvoracek et al. | 148—6.35 XR |

MORRIS O. WOLK, Primary Examiner

M. D. BURNS, Assistant Examiner

U.S. Cl. X.R.

21—2.7, 2.5; 23—2, 150, 196; 148—6.35; 260—555